US007060948B2

(12) United States Patent
Cho et al.

(10) Patent No.: US 7,060,948 B2
(45) Date of Patent: Jun. 13, 2006

(54) TEMPERATURE CONTROL METHOD AND APPARATUS FOR DRIVING POLYMERASE CHAIN REACTION (PCR) CHIP

(75) Inventors: Dong-il Cho, Seoul (KR); Dae-sung Yoon, Gyeonggi-do (KR); Young-sun Lee, Gyeonggi-do (KR); Dong-hoon Yi, Seoul (KR); Geun-bae Lim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 239 days.

(21) Appl. No.: 10/307,694

(22) Filed: Dec. 2, 2002

(65) Prior Publication Data
US 2003/0169799 A1 Sep. 11, 2003

(30) Foreign Application Priority Data
Mar. 6, 2002 (KR) ............................ 2002-0011874

(51) Int. Cl.
*H05B 1/02* (2006.01)
(52) U.S. Cl. ...................... 219/497; 219/486; 219/501; 219/507; 422/68.1; 435/287.1; 435/283.1; 435/303.1; 307/39; 702/130
(58) Field of Classification Search ................ 219/497, 219/499, 506, 483–486, 508, 501; 422/68.1, 422/81; 435/283.1, 283.2, 283.3, 303.1, 435/287.1; 307/39–41; 702/97–99, 130, 702/132
See application file for complete search history.

(56) References Cited

U.S. PATENT DOCUMENTS 5,939,312 A * 8/1999 Baier et al. .............. 435/287.2

| | | | |
|---|---|---|---|
| 6,132,996 A * | 10/2000 | Hunicke-Smith | 435/91.2 |
| 6,197,595 B1 * | 3/2001 | Anderson et al. | 436/180 |
| 6,261,431 B1 * | 7/2001 | Mathies et al. | 204/601 |
| 6,534,009 B1 * | 3/2003 | Yao | 422/68.1 |
| 6,556,940 B1 * | 4/2003 | Tretiakov et al. | 702/130 |
| 6,673,593 B1 * | 1/2004 | Mastromatteo et al. | 435/283.1 |

FOREIGN PATENT DOCUMENTS

| | | |
|---|---|---|
| CN | 2148079 Y | 12/1993 |
| JP | 2001-136954 | 5/2001 |
| WO | WO 98/24548 | 6/1998 |

OTHER PUBLICATIONS

An Office Action issued by the Chinese Patent Office on Nov. 26, 2004, regarding corresponding Chinese Patent Application No. 02810161.8.

* cited by examiner

*Primary Examiner*—Mark Paschall
(74) *Attorney, Agent, or Firm*—Cantor Colburn LLP

(57) ABSTRACT

Provided are a temperature control method and apparatus for driving a polymerize chain reaction (PCR) chip. In the temperature control apparatus, which is for a polymerize chain reaction chip, PCR chips receive electric power from the outside and generating heat to maintain a predetermined temperature and for outputting actual temperature information to the outside. electric power supply units supply electric power to the PCR chips according to input control signals, and a controller generates the control signals based on control information including pre-established control temperature and control time information and the actual temperature information supplied from the PCR chips in order to supply the control signals to the electric power supply units. In the present invention, it is possible to examine various kinds of DNA at the same time because the temperature control apparatus controls the temperatures of DNA samples at the same time.

17 Claims, 9 Drawing Sheets

TEMPERATURE CONTROL METHOD AND APPARATUS FOR DRIVING POLYMERASE CHAIN REACTION (PCR) CHIP

BACKGROUND OF THE INVENTION

1. Field of the Invention

The present invention relates to a temperature control method and apparatus, and more particularly, to a temperature control method and apparatus for driving a polymerase chain reaction (PCR) chip.

2. Description of the Related Art

A conventional apparatus for amplifying deoxyribonucleic acid (DNA) is by using a PCR, which amplifies multiple DNA samples at the same temperature cycles. Such a process can amplify more than 14 samples of DNA wherein each sample is placed into a tube having a content of 0.5 ml or 0.2 ml. The conventional apparatus has an advantage of analyzing the DNA samples of a plurality of patients at the same time; however, it is difficult to examine various kinds of DNAs at the same time because temperature conditions for maximizing the amplification of DNAs are different depending on the kind of DNA. In addition, an amount of the DNA samples required for the experiment is at least 0.2 ml. Accordingly, the conventional method needs to extract a large amount of the DNA samples from the patients. In addition, since large amounts of carcinogenic materials are added to the conventional PCR apparatus, an environmental contamination occurs.

SUMMARY OF THE INVENTION

To solve the above-described and related problems, the present disclosure provides a temperature control method and apparatus for a polymerase chain reaction (PCR) chip.

To accomplish this, there is provided a temperature control apparatus for a PCR chip, the temperature control apparatus comprising: PCR chips for receiving electric power from the outside and generating heat to maintain a predetermined temperature and for outputting actual temperature information to the outside; electric power supply units for supplying electric power to the PCR chips according to input control signals; and a controller for generating the control signals based on control information including pre-established control temperature and control time information and the actual temperature information supplied from the PCR chips in order to supply the control signals to the electric power supply units.

Preferably, the temperature control apparatus further includes: a selector for receiving a first selection signal for selecting the PCR chip to be controlled and the control signal from the controller, in order to select the electric power supply unit for supplying the electric power to the PCR chip to be controlled and supply the control signal to the selected electric power supply unit; and a multiplexer for receiving a second selection signal for selecting one of the PCR chips from the controller and supplying the actual temperature information on a predetermined PCR chip to the controller according to the second selection signal.

Preferably, at least one PCR chip in the temperature control apparatus includes: a heater for receiving electric power from the electric power supply unit to generate heat; and a temperature sensor for measuring the temperature of the PCR chip and outputting the temperature to the outside.

Preferably, the temperature control apparatus further includes: an input/output (I/O) unit for receiving control information including the control temperature and time information from a user, in order to supply the control information to the controller and outputting the control result of the temperature of a predetermined PCR chip to the outside according to the control information.

The present disclosure further provides a temperature control method for a PCR chip, the method comprising: (a) receiving control information including the control temperature and time of a PCR chip; (b) generating a control signal for the PCR chip to maintain the control temperature for the predetermined time; and (c) controlling the temperature of the PCR chip according to the control signal.

Preferably, step (b) includes (b1) generating a selection signal for selecting a PCR chip to be controlled by the control signal when a plurality of PCR chips are arranged, and in step (c), the temperature of the predetermined PCR chip is controlled according to the selection signal and the control signal.

Preferably, the temperature control method further includes: (d) measuring the temperature of the PCR chip; and (e) repeating (b) when the actual temperature and the control temperature of the PCR chip are different.

Preferably, step (e) includes: (e1) generating information for selecting a predetermined PCR chip when a plurality of PCR chips are arranged; and (e2) subsequently comparing the actual temperature of the selected PCR chip with the control temperature corresponding to the selected PCR chip to perform (b) when the actual temperature and control temperature are different.

The disclosure further provides a recording medium readable in a computer, wherein a program for operating a method among the above methods is recorded.

BRIEF DESCRIPTION OF THE DRAWINGS

The above objective and advantages of the present invention will become more apparent by describing in detail preferred embodiments thereof with reference to the attached drawings in which.

DETAILED DESCRIPTION OF THE INVENTION

Figure 1:
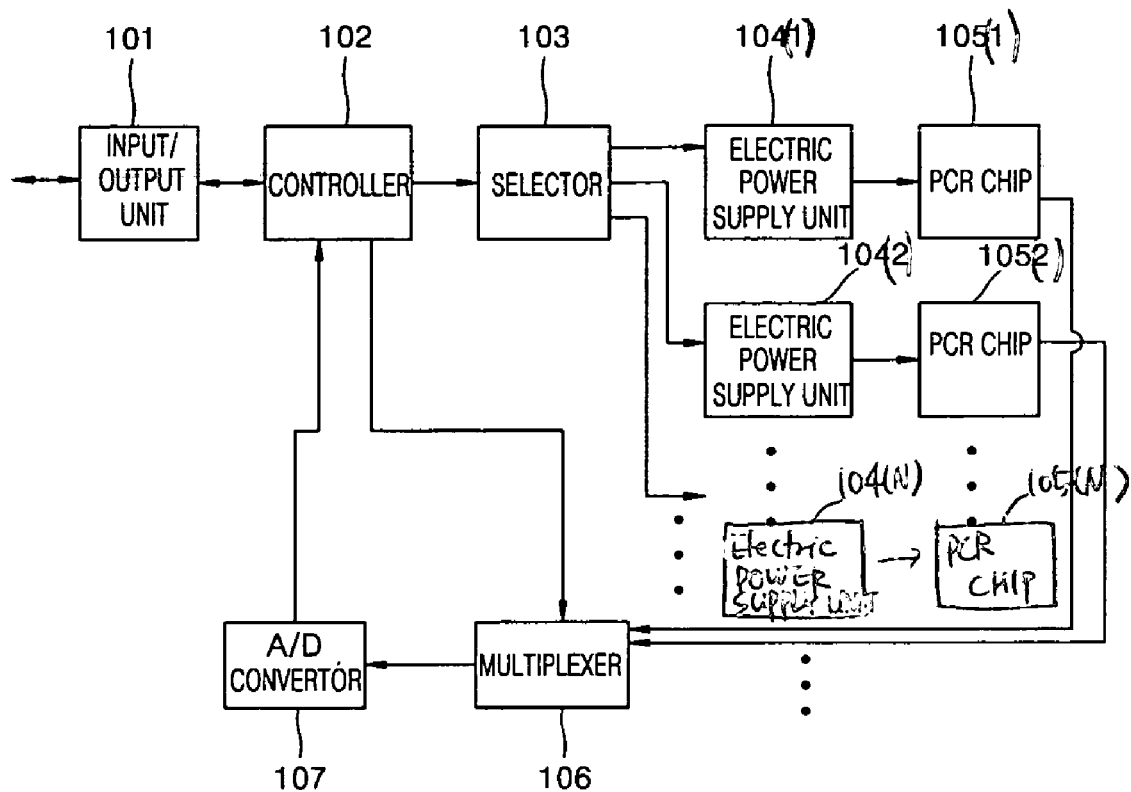
FIG. 1 is a block diagram illustrating a temperature control apparatus for a PCR chip.

FIG. 1 is an exemplary embodiment of a block diagram illustrating a temperature control apparatus for a polymerase chain reaction (PCR). An input/output (I/O) unit 101 receives selection information, control temperature and time information for a particular PCR chip ("a selected PCR chip"), which is to be controlled at a predetermined temperature and for a predetermined time, from a user (not shown), and supplies the information to a controller 102. In addition, I/O unit 101 receives the control result information for the selected PCR chip, i.e., actual temperature information about the selected PCR chip, from controller 102, and provides the control result information about the selected PCR chip, i.e., the actual temperature information about the selected PCR chip, to a user.

Controller 102 generates a control signal based on the selection information, the control temperature and time information from I/O unit 101, and collects the actual temperature information about the selected PCR chip in order to supply the actual temperature information to I/O unit 101. In addition, controller 102 generates a selection signal for selecting the selected PCR chip (whose temperature will be read out in order) among a plurality of PCR chips 105(1), 105(2), ..., 105(N) and provides the selection signal to a multiplexer 106.

A selector 103 selects one of electric power supply units 104(1), 104(2), ..., and 104(N) that provides an electric power to the corresponding selected PCR chip according to the control signal from controller 102, respectively, and provides the control signal to the selected electric power supply units 104(1), 104(2), ..., and 104(N) respectively.

Electric power supply units 104(1), 104(2), ..., and 104(N) respectively supply electric power to the corresponding PCR chip 105(1) 105(2), ..., and 105(N), which is connected to electric power supply unit 104(1), 104(2), ..., and 104(N), respectively, based on the control signal from selector 103.

PCR chips 105(1), 105(2), ..., and 105(N) respectively receive electric power from electric power supply units 104(1), 104(2), ..., and 104(N) and generate heat by using the electric power, thereby controlling the chip temperature. PCR chips 105(1), 105(2), ..., and 105(N) respectively measure their own temperatures and respectively supply the temperature values to multiplexer 106.

Multiplexer 106 receives actual temperature information for the PCR chips 105(1), 105(2), ..., and 105(N) from the PCR chips 105(1), 105(2), ..., and 105(N) and receives the selection signal for selecting the selected PCR chip from controller 102 in order to provide the actual temperature information for the selected PCR chip selected by the selection signal to an analog/digital (A/D) conversion unit 107.

A/D convertor 107 receives the actual temperature information for the selected PCR chip selected by the selection information from multiplexer 106, converts the actual temperature information into a digital signal, and supplies the digital signal to controller 102.

Figure 2:
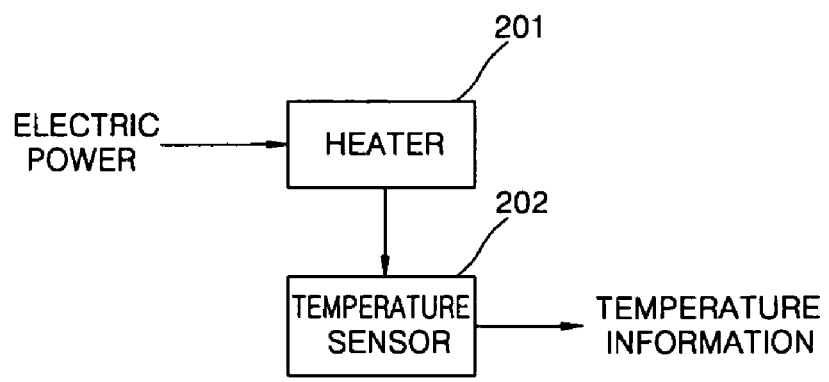
FIG. 2 is a block diagram illustrating a PCR chip.

FIG. 2 is a block diagram illustrating an exemplary PCR chip that may be utilized in the temperature control apparatus of FIG. 1. Each of the PCR chips 105(1), ..., and 105(N) comprises a heater 201 and a temperature sensor 202. Heater 201 receives electric power from the corresponding electric power supply units 104(1), 104(2), ..., and 104(N) to generate heat.

Temperature sensor 202 measures the actual temperature of heater 201 and outputs the temperature to multiplexer 106.

Figure 3:
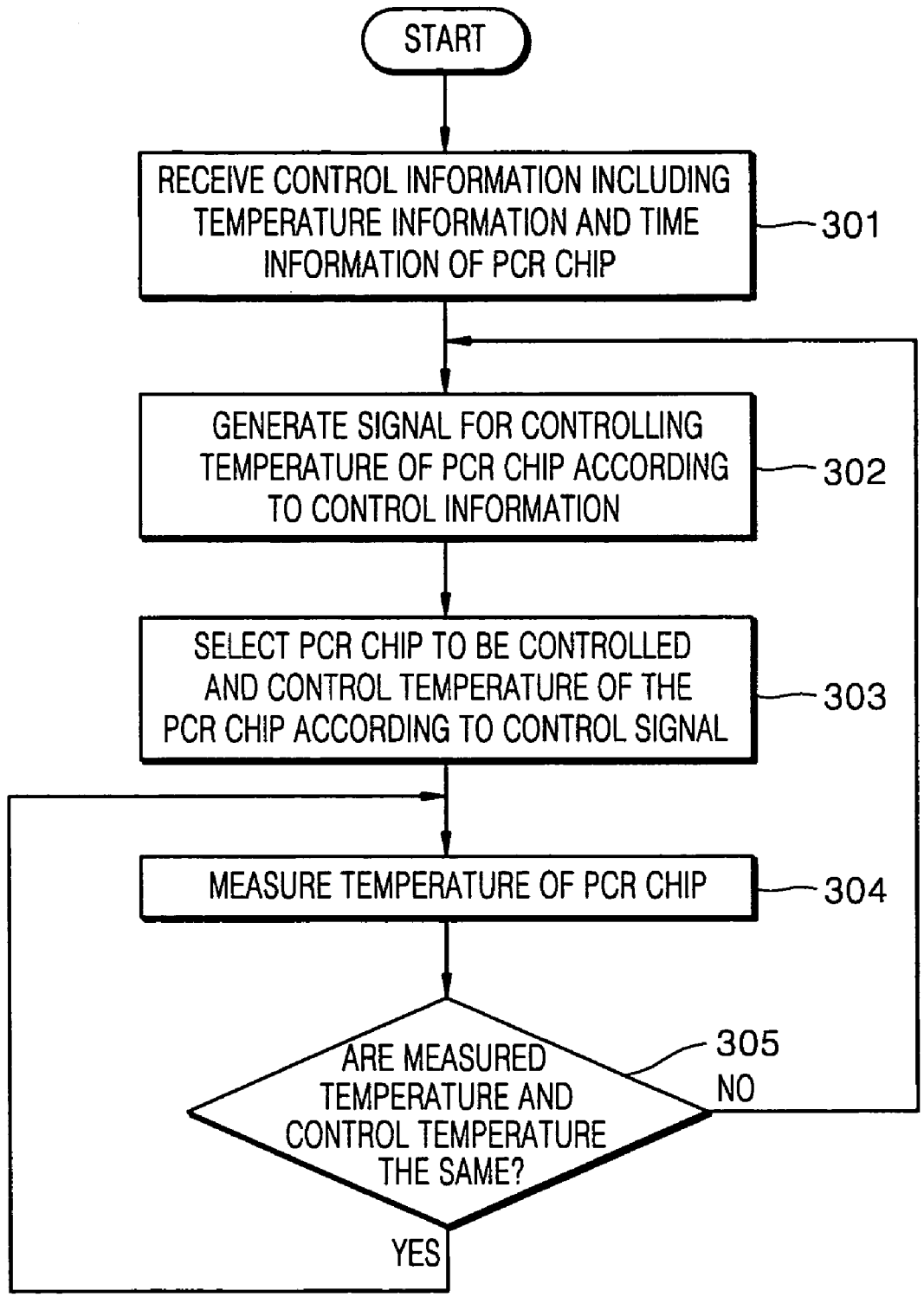
FIG. 3 is a flowchart explaining a temperature control method for a PCR chip.

FIG. 3 is a flowchart depicting an exemplary temperature control method for a PCR chip. The I/O unit inputs control information, including temperature information and time information for a selected PCR chip, into the controller (step 301). The controller generates a control signal for controlling the temperature of the PCR chip according to the control information (step 302). Thereafter, the selected PCR chip is selected among the PCR chips by the control signal to control the temperature of the selected PCR chip (step 303). Next, the actual temperature of the selected PCR chip is measured (step 304) and the measured temperature is compared with the control temperature of the control information (step 305). When the temperatures are the same, the method proceeds to step 304. When the temperatures are different, the method proceeds to step 302.

Figure 4:
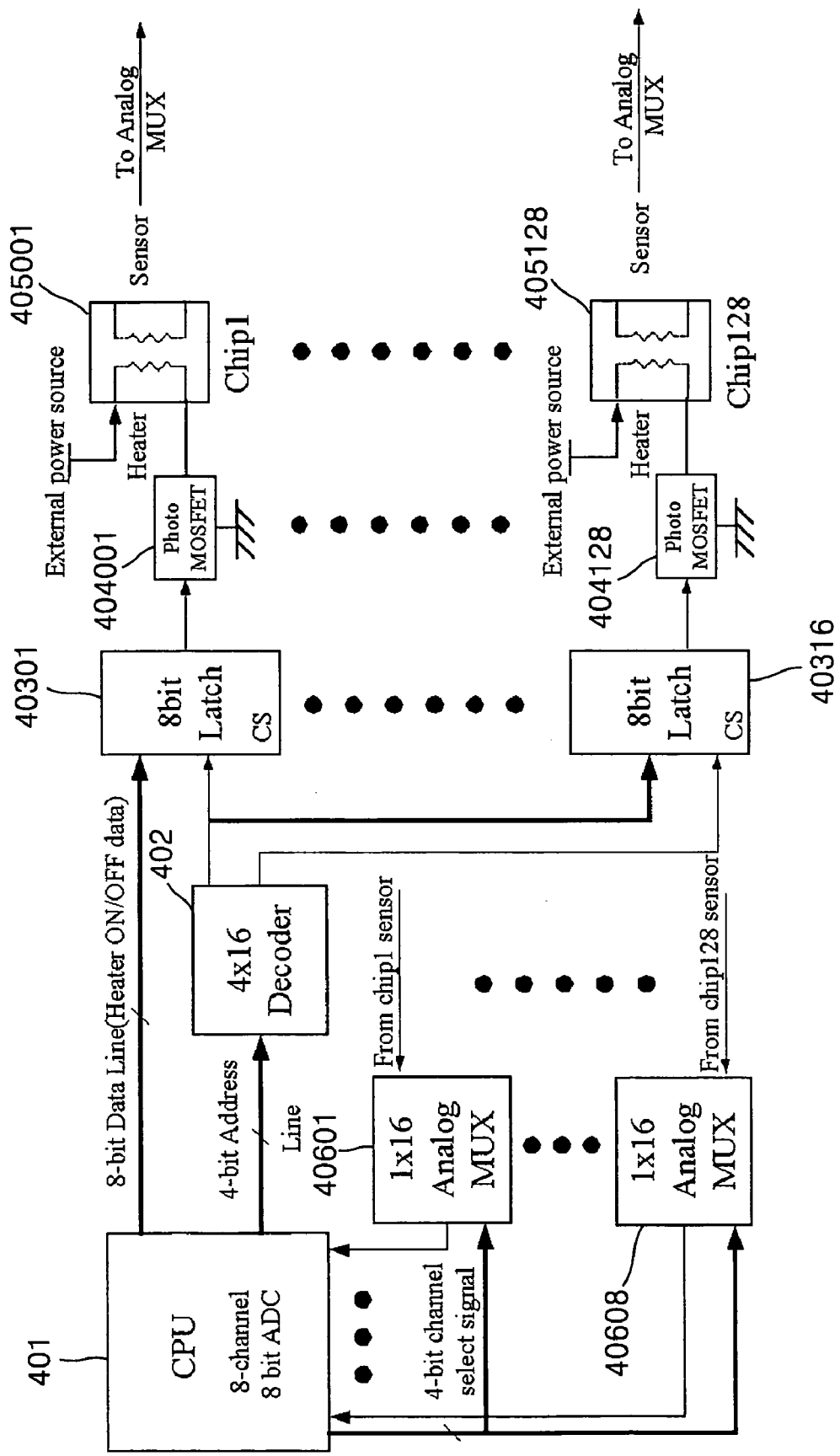
FIG. 4 is a diagram illustrating an exemplary configuration of the temperature control apparatus of the PCR chip of FIG. 1.

FIG. 4 shows an exemplary configuration of the temperature control apparatus depicted in FIG. 1. In this exemplary embodiment, 128 PCR chips are used. When a constant current is applied to the platinum sensors of the different PCR chips, different voltages are generated at both ends of the platinum sensors according to the temperatures of the PCR chips. The different voltages are processed and transferred to a CPU. The CPU converts the analog voltage information into digital information and compares the measured temperature of the PCR chip with a target temperature. If the measured temperature is higher than the target temperature, a heater of the chip is turned off. If the measured temperature is lower than the target temperature, the heater of the chip is turned on.

For instance, a CPU 401 corresponds to controller 102 of FIG. 1. CPU 401 generates a control signal for controlling a temperature of a PCR chip (a selected PCR chip) to be controlled based on a predetermined control temperature and time information about the selected PCR chip. The control signal includes heater on/off signals that are supplied to photo MOSFETs 404001, ..., and 404128 (which each correspond to one of the electric power supply units 104(1), ..., and 104(N) of FIG. 1), and 4-bit address signals for selecting the selected PCR chip. The heater on/off signals are supplied to 8-bit latches 40301, ..., and 40316, and the 4-bit address signals are supplied to the 8-bit latches 40301, ..., and 40316 through a decoder 402. Accordingly, decoder 402 and 8-bit latches 40301, ..., and 40316 correspond to selector 103 of FIG. 1.

Latches 40301, ..., and 40316 select the selected PCR chip among the plurality of PCR chips 405001, ..., and 405128 by using the 4-bit address signals, and supply the heater on/off signals to the photo MOSFET 404001, ..., and 404128 that supply an electric power to the PCR chips 405001, ..., and 405128, respectively. The Photo MOSFET 404001, ..., and 404128 respectively supply an electric power to the PCR chips 405001, ..., and 405128 according to the heater on/off signals, and the PCR chips 405001, ..., and 405128 respectively generate a heat by using the supplied electric power. In addition, actual temperature information about the PCR chips is generated and supplied to analog multiplexers 40601, ..., and 40608, respectively.

Analog multiplexers 40601, ..., and 40608 receive the selection signal for selecting the selected PCR chip, whose temperature will be read out, from CPU 401, and receive the actual temperature information about the selected PCR chip to provide the actual temperature information of the selected PCR chip to CPU 401.

Figure 5:
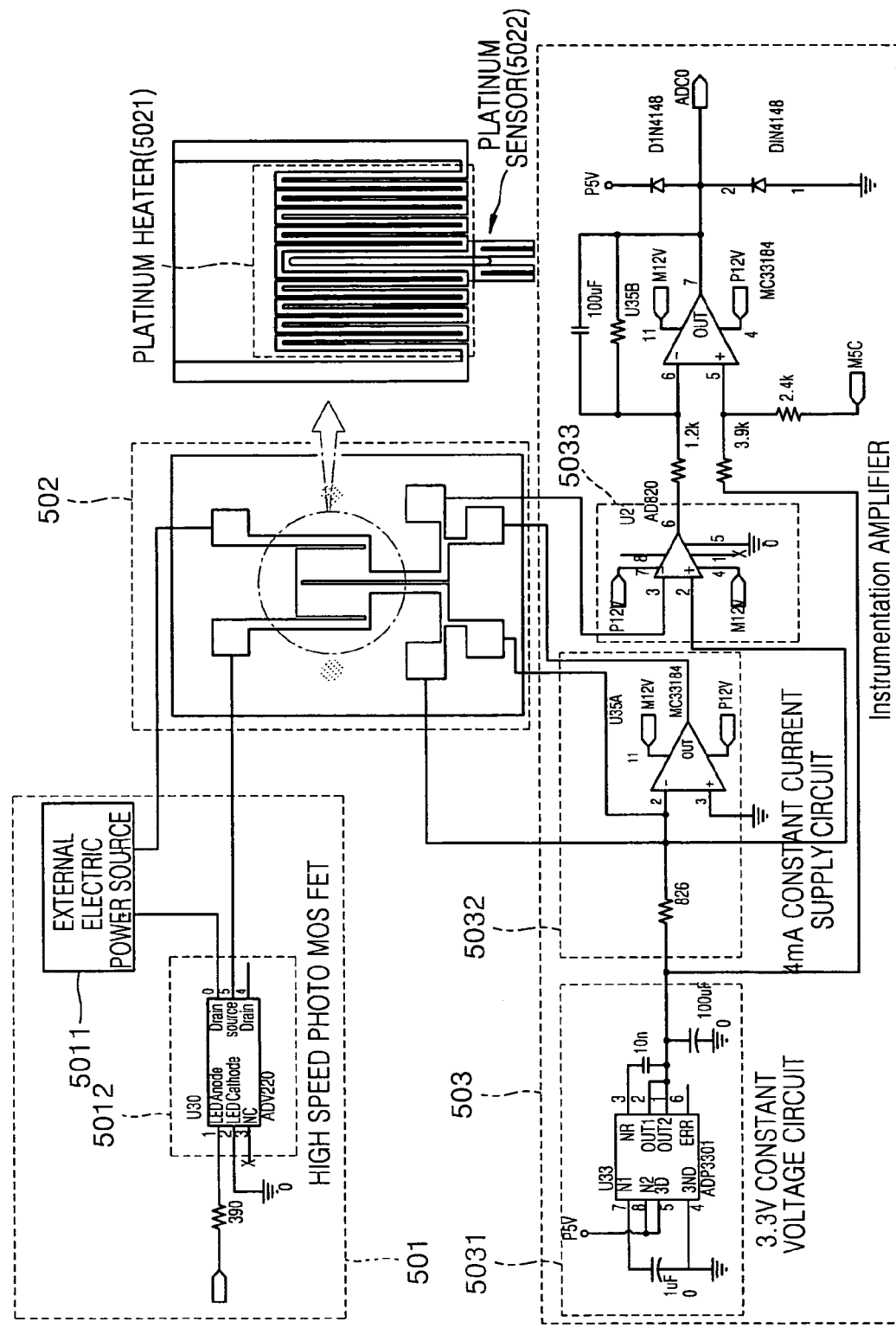
FIG. 5 is a diagram illustrating an exemplary configuration of the PCR chip of FIG. 2.

FIG. 5 is an exemplary configuration of a PCR chip of FIG. 2. Here, a PCR chip comprises a platinum heater 5021 and a platinum sensor 5022. In order to generate a fine constant current for measurement, for example, a regulator ADP3301 having an output voltage error of 0.8% and a high performance op-amp MC33184 are used to generate a constant current of 4 mA, and the constant current is supplied to platinum sensor 5022. Here, a four-point probe method is used to measure the voltages generated in the platinum sensor. In this case, the voltages at both ends of the platinum sensor are measured by using an instrumentation amplifier. In addition, DC offset and amplification rates of the voltages are controlled at an end circuit, and the voltages are supplied to analog multiplexers through an over voltage limiter including two diodes. A CPU recognizes the temperature of the PCR chip based on the supplied information and generates a control command by comparing the temperature of the PCR chip with the target temperature. In addition, the CPU switches an external electric power supplied to a heater by using a high-speed photo MOSFET, instead of a relay, to control the temperature of the PCR chip.

For instance, an electric power supply unit 501 comprises an external electric power source 5011 and a photo MOSFET 5012 that receives an on-signal or an off-signal from an outside to turn on or turn off external electric power source 5011. The electric power of electric power supply unit 501 is supplied to platinum heater 5021 of a heater 502.

Heater 502 comprises platinum heater 5021 and platinum sensor 5022. Platinum heater 5021 converts the electric power supplied from external electric power source 5011 into heat. Platinum sensor 5022 receives a constant voltage and a constant current from a temperature sensor 503 to generate a voltage corresponding to the temperature of platinum heater 5021 and outputs the temperature.

Temperature sensor 503 comprises a constant voltage circuit 5031, e.g., a regulator ADP3301, a constant current circuit 5032, e.g., an op-amp MC33184, and an amplifier 5033 for amplifying a difference between an input voltage and an output voltage. Temperature sensor 503 supplies the constant voltage and constant current to platinum sensor 5022, and measures the temperature of platinum heater 5021 by comparing the output voltage of platinum sensor 5022 corresponding to the temperature of platinum heater 5021 with an input voltage, i.e., the constant voltage. The actual temperature information about platinum heater 5021, which is measured in circuit 503, is output to an analog multiplexer.

FIGS. 6–10 depict data obtained from using the temperature control apparatus disclosed herein. PCR samples were prepared, wherein a plasmid deoxyribonucleic acid (DNA) was used as an amplifying sample, and a driving solution is formed by adding a buffering solution including primer, dNDP, salt, and DNA polymerase enzyme. After flowing the driving solution into an inlet of a PCR chip to fill a reaction chamber, the inlet and outlet of the reaction chamber were sealed with fine block and epoxy. The temperature control apparatus set temperature sections of 55° C., 72° C., and 95° C. and a maintenance time of 30 seconds for each temperature section.

Figure 6:
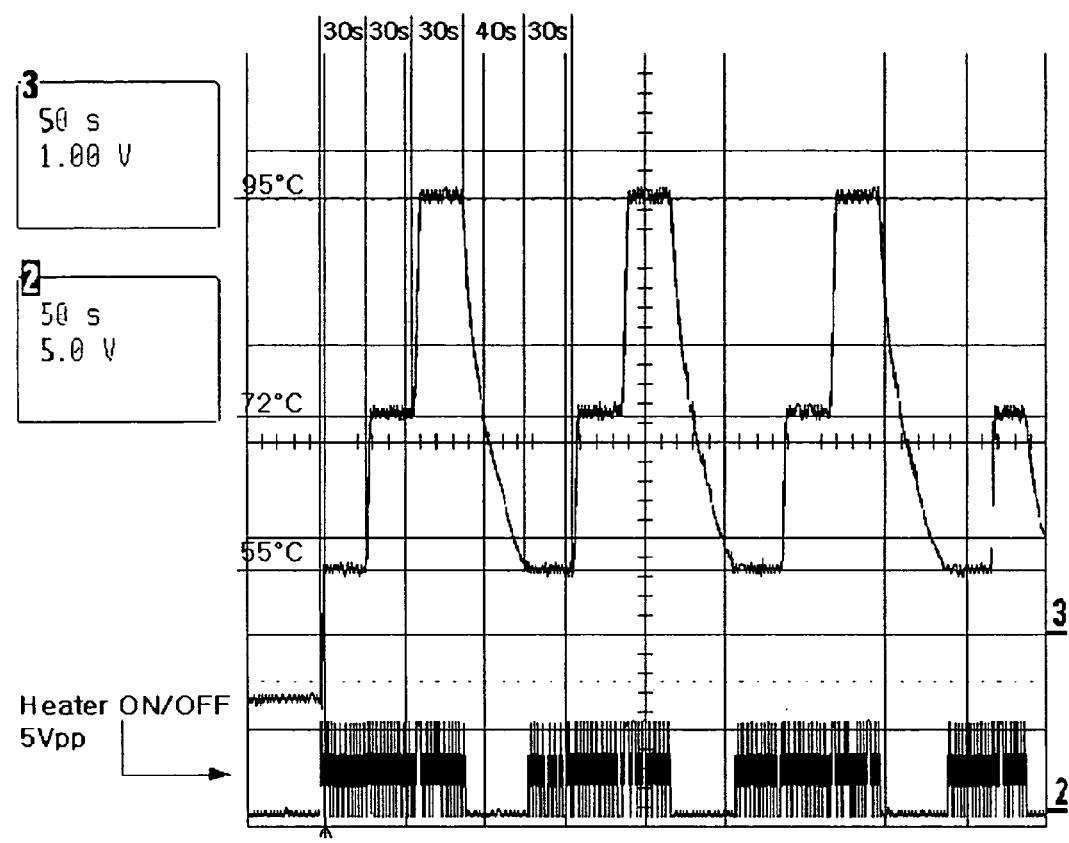
FIG. 6 illustrates a waveform of a voltage of a platinum sensor measured at an analog/digital converter input terminal by using an oscilloscope.
Figure 7:
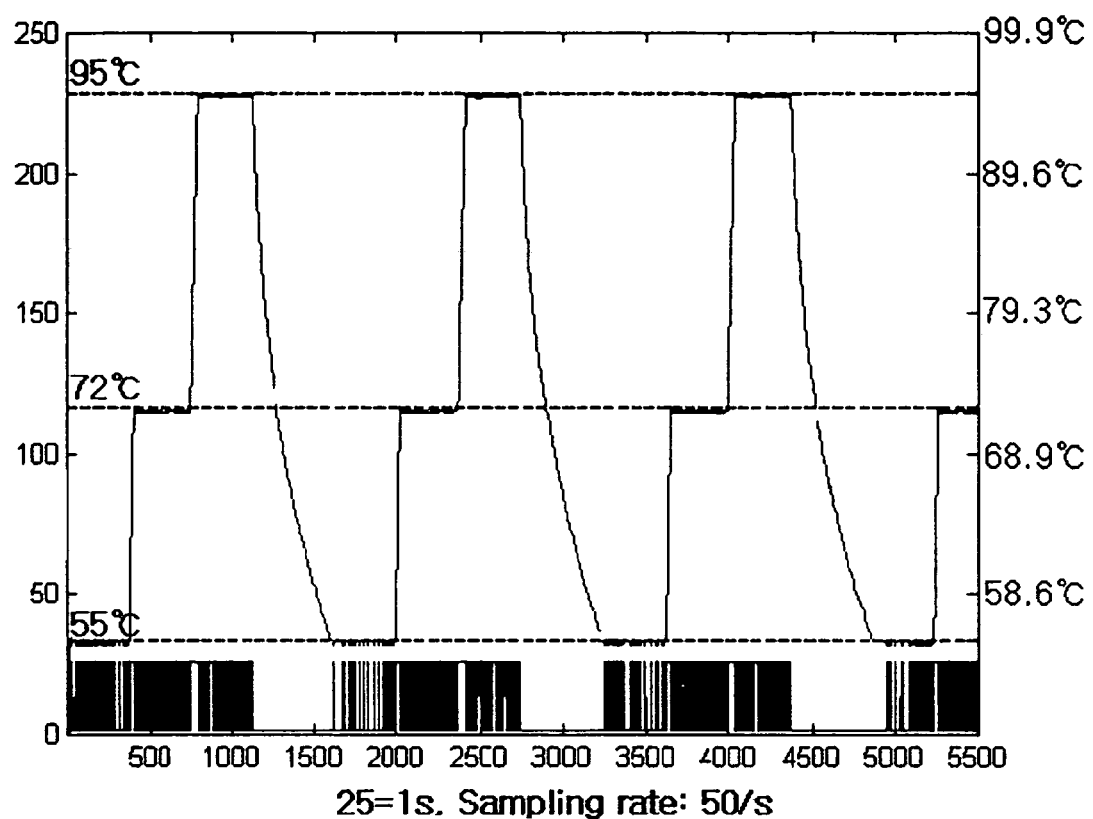
FIG. 7 illustrates a waveform of a voltage of a platinum sensor measured at the CPU of FIG. 5.

FIG. 6 illustrates a waveform of a voltage of a platinum sensor measured at an A/D converter input terminal by using an oscilloscope according to an embodiment of the present disclosure. In FIG. 6, a temperature of a select PCR chip is controlled by using a PCR chip according to the present disclosure. FIG. 7 illustrates a waveform of a voltage of a platinum sensor measured at the CPU of FIG. 5. As shown in FIGS. 6 and 7, the temperature control apparatus according to the present disclosure recognizes the output values of the platinum sensor.

Figure 8:
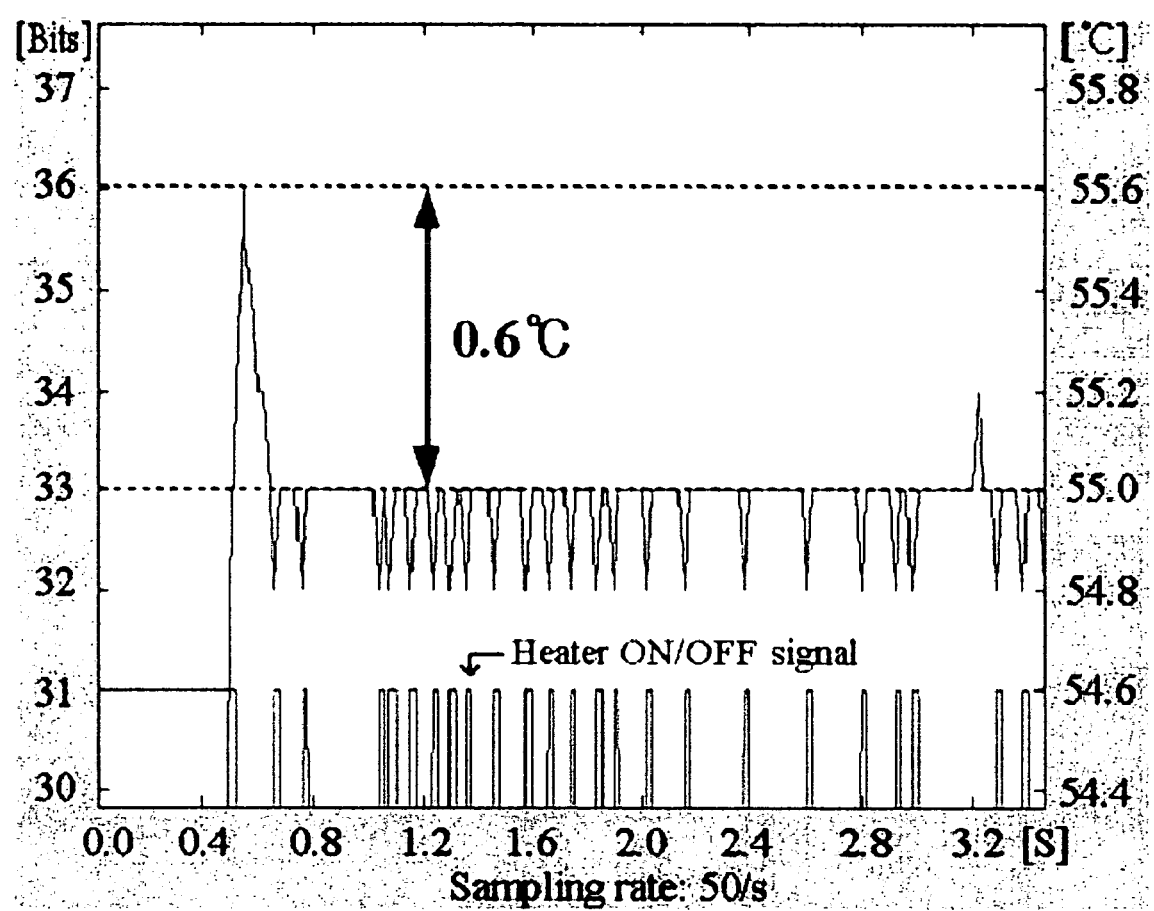
FIG. 8 illustrates an overshoot of the platinum heater temperature of FIG. 5.
Figure 9:
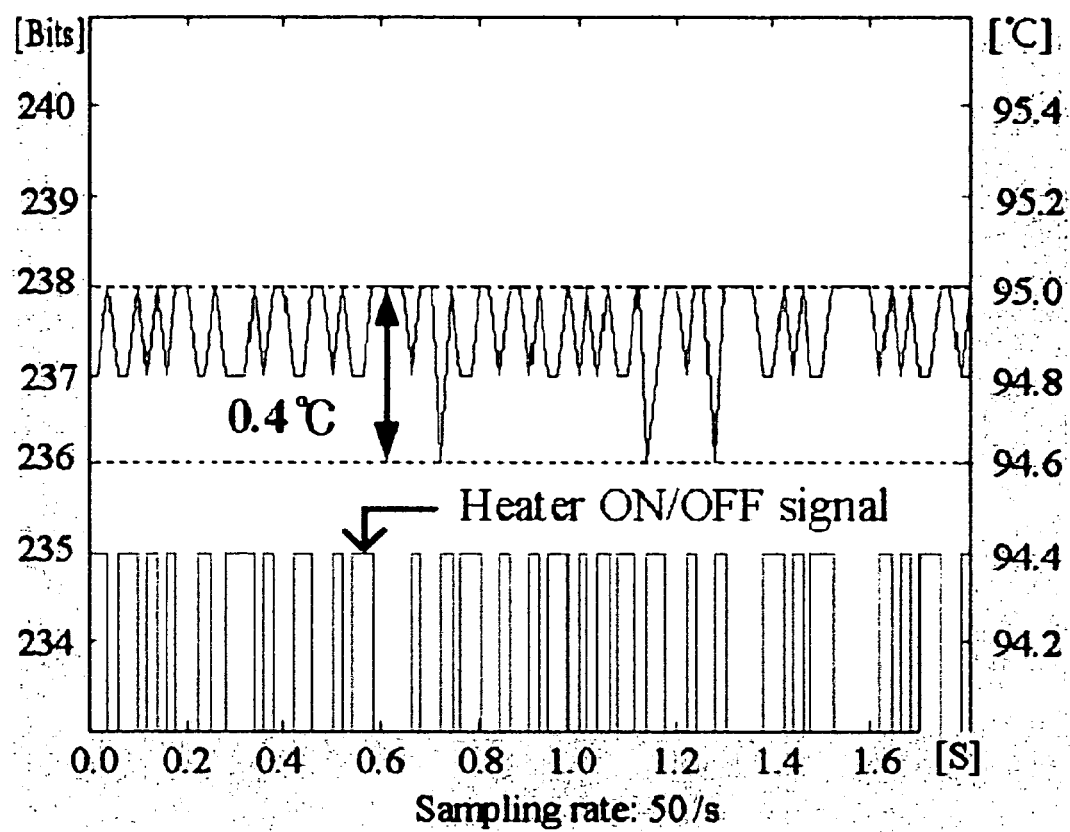
FIG. 9 illustrates a normal state error of the platinum heater temperature of FIG. 5.

FIG. 8 illustrates an overshoot of a platinum heater temperature according to an embodiment of the present disclosure, and FIG. 9 illustrates a normal state error of a platinum heater temperature according to an embodiment of the present disclosure. As shown in FIGS. 8 and 9, a temperature control apparatus according to the present disclosure can control a micro PCR chip while having a normal state error of plus or minus about 0.4° C., an overshoot of less than about 0.6° C., and an increasing speed of about 6.8° C./sec. The above temperature control apparatus has a performance as good as the performance of a conventional product that amplifies a PCR by using tubes of 0.2 ml.

Figure 10:
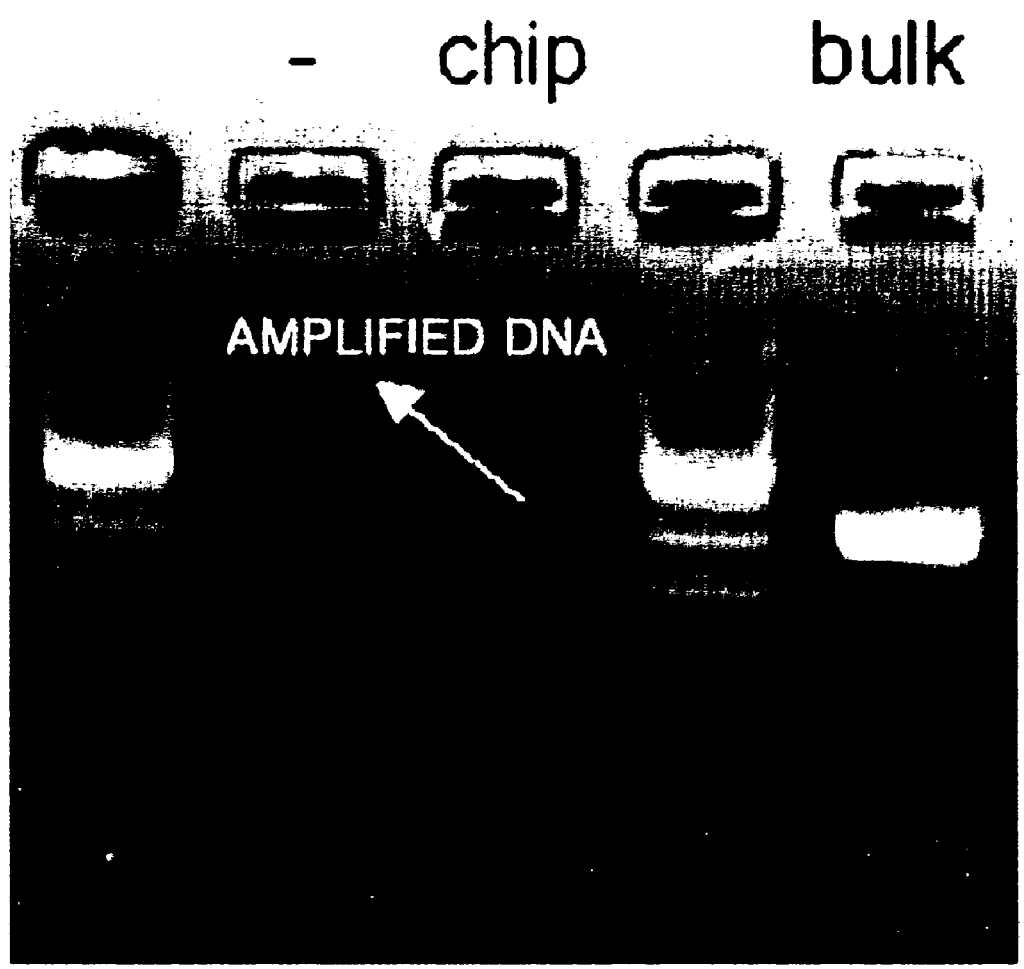
FIG. 10 illustrates an amplified deoxyribonucleic acid fluorescent image generated by a temperature control apparatus.

FIG. 10 illustrates an amplified DNA fluorescent image generated by using the temperature control apparatus disclosed herein. Here, clear amplified DNA bands are represented in the image of FIG. 10.

A temperature control apparatus and method according to the embodiments of the present disclosure may be embedded as computer programs in a computer so that the apparatus and method may be realized in a digital computer that operates the program by using a recording medium used in the computer.

The recording medium used in the computer may comprise a magnetic recording media, for example, ROM, floppy disks, and hard disks; an optical recording media, for example, CD-ROM and DVD; and a carrier wave, for example, transfer through the Internet.

According to an exemplary embodiment of the present disclosure, a plurality of DNA samples is simultaneously examined under different temperature conditions so that examination and analysis times can be reduced. In addition, only a small amount of samples are required for the examination; thus the burden on patients can be reduced while also reducing environmental contamination.

In addition, a temperature control apparatus according to the present disclosure controls the temperature of a fine PCR chip so that the temperature is rapidly increased and decreased. In addition, the temperature of a reaction chamber can be precisely measured in a short time by using a platinum sensor attached under the chamber of the PCR chip, so that the temperature of the PCR chip can be precisely controlled.

While this invention has been particularly shown and described with reference to preferred embodiments thereof, the preferred embodiments described above are merely illustrative and are not intended to limit the scope of the invention. It will be understood by those skilled in the art that various changes in form and details may be made therein without departing from the spirit and scope of the invention as defined by the appended claims and equivalents thereof.

What is claimed is:

1. A temperature control apparatus for a PCR chip comprising:
   a plurality of PCR chips;
   a plurality of electric power supply units, wherein each of the electric power supply units corresponds to at least one of the PCR chips, and supplies an electric power to the corresponding PCR chip according to a control signal, wherein each electric power supply unit comprises a photo MOSFET; and
   a controller for receiving control information including a predetermined control temperature of a predetermined PCR chip among the PCR chips and actual temperature information of the predetermined PCR chip and for comparing the control information with the actual temperature information to generate the control signal.

2. The temperature control apparatus of claim 1, further comprising:
   a selector for receiving a first selection signal for selecting the predetermined PCR chip and the control signal from the controller, in order to select the corresponding one of the electric power supply units and supply the control signal to the selected electric power supply unit; and a multiplexer for receiving a second selection signal for selecting the predetermined PCR chip from the controller and supplying the actual temperature information about the predetermined PCR chip to the controller according to the second selection signal.

3. The temperature control apparatus of claim 1, wherein each of the PCR chips comprises:

a heater for receiving the electric power from the corresponding one of the electric power supply units to generate heat; and a temperature sensor for measuring an actual temperature of the PCR chip and outputting the actual temperature information.

4. The temperature control apparatus of claim 1, further comprising:

an input/output unit for receiving the control information from a user, supplying the control information to the controller, and outputting a control result of the temperature of the predetermined PCR chip according to the control information.

5. The temperature control apparatus of claim 1, wherein the controller further receives the control information including control time information.

6. The temperature control apparatus of claim 3, wherein the controller generates the control signal including a heater off signal when the actual temperature is higher than the predetermined control temperature.

7. A method for controlling a temperature of a PCR chip, the method comprising:

receiving control information including a control temperature and a control time of a predetermined PCR chip;

measuring an actual temperature of the predetermined PCR chip;

comparing the control temperature with the actual temperature of the predetermined PCR chip to generate a control signal; and supplying the control signal to a photo MOSFET which controls whether a heater supplies heat controlling the actual temperature of the predetermined PCR chip according to the control signal.

8. The method of claim 7, further comprises generating a selection signal for selecting the predetermined PCR chip among a plurality of PCR chips.

9. The method of claim 7, further comprising:

repeating the generating of the control signal when the actual temperature of the predetermined PCR chip and the control temperature of the control information are different.

10. The method of claim 9, wherein repeating the generating of the control signal comprises:

generating information for selecting another predetermined PCR chip among the plurality of PCR chips; and comparing an actual temperature of the selected PCR chip with a control temperature corresponding to the selected PCR chip.

11. The method of claim 9, wherein measuring the actual temperature of the predetermined PCR chip comprises:

applying an electric power to the predetermined PCR chip to generate heat; and measuring the actual temperature of the predetermined PCR chip.

12. The method of claim 7, wherein controlling the actual temperature of the predetermined PCR chip according to the control signal comprises generating the control signal including a heater off signal of the predetermined PCR chip when the actual temperature is higher than the controller temperature.

13. A program storage device readable by a machine, tangibly embodying a program of instructions executable by the machine to perform a method for recovering data in a communications system, the method comprising:

receiving control information including a control temperature and a control time of a predetermined PCR chip;

measuring an actual temperature of the predetermined PCR chip;

comparing the control temperature with the actual temperature of the predetermined PCR chip to generate a control signal; and supplying the control signal to a photo MOSFET which controls whether a heater supplies heat to controlling the actual temperature of the predetermined PCR chip according to the control signal.

14. The program storage device of claim 13, further comprising generating a selection signal for selecting the predetermined PCR chip among a plurality of PCR chips.

15. The program storage device of claim 13, wherein the method further comprises:

repeating the generating of the control signal when the actual temperature and the control temperature of the control information are different.

16. The program storage device of claim 15, wherein repeating the generating of the control signal comprises:

generating information for selecting another predetermined PCR chip among the plurality of PCR chips; and comparing the actual temperature of the selected PCR chip with the control temperature corresponding to the selected PCR chip.

17. The program storage device of claim 13, wherein controlling the actual temperature of the predetermined PCR chip according to the control signal comprises generating the control signal including a heater off signal of the predetermined PCR chip when the actual temperature is higher than the control temperature.

* * * * *